Fig. 3.

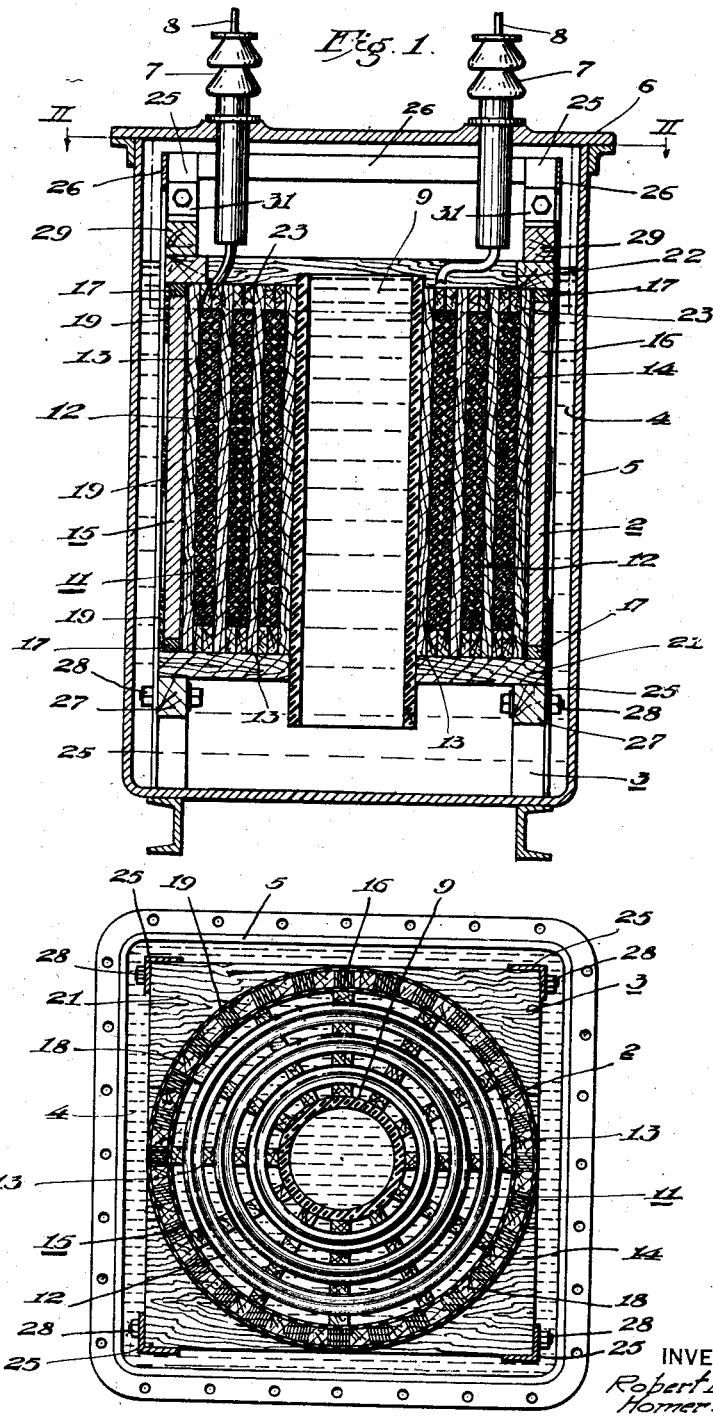

Patented June 23, 1931

1,811,466

UNITED STATES PATENT OFFICE

ROBERT B. GEORGE AND HOMER B. WEST, OF SHARON, PENNSYLVANIA, ASSIGNORS TO WESTINGHOUSE ELECTRIC AND MANUFACTURING COMPANY, A CORPORATION OF PENNSYLVANIA

CURRENT-LIMITING REACTOR

Application filed September 18, 1929. Serial No. 393,564.

Our invention relates to current-limiting reactors of the oil-immersed type and particularly to means for shielding the containing vessel from the stray or leakage magnetic flux.

If the containing vessel for the oil and the reactor coil consists of ordinary steel, the hysteresis and eddy-current and other stray losses in the vessel become very large, due to the leakage magnetic flux, thus causing excessive heating and objectionable losses therein.

A tank of non-magnetic or non-metallic construction is not practicable for use as an oil container and it does not satisfactorily dissipate the heat generated within the tank. Metals of high resistivity and low permeability are available but they must be cast and, therefore, are not suitable for the fabrication of large oil-tight tanks, or they are composed of expensive alloys that are prohibited by economical conditions.

We have overcome the above-mentioned difficulties in connection with the ordinary transformer tanks of steel construction by providing a path of high permeability for shunting the lines of magnetic force away from the walls of the tank.

A highly efficient method of shielding the casing from the leakage flux is to provide a path of low magnetic reluctance in a part of the region between the casing and the reactor coil. This provides a suitable path of high permeability for the leakage flux.

One method of shielding the casing of an oil-immersed reactor consists in affixing a laminated iron shield to the inside of the reactor casing. This construction requires a supporting structure attached to the casing and a great quantity of iron because the shields are not as effective near the walls of the casing as they are when placed nearer the coil.

One object of our invention is to provide means for shielding the enclosing casing of an oil-immersed reactor from the effects of the leakage magnetic flux that shall be simple and efficient and economical of materials.

Another object of our invention is to provide a magnetic shield for an oil-immersed-reactor casing that shall not require an extra supporting structure.

Another object of our invention is to provide a magnetic shield for the enclosing casing of an oil-immersed reactor that shall be integral with the reactor coil itself.

To achieve the objects of our invention, we propose to affix a plurality of groups of iron sheets to the outside of the reactor coil and make them integral therewith.

Our invention may be better understood if reference is made to the accompanying drawings in connection with the following description.

Figure 1 is a vertical sectional view of a current-limiting reactor employing one embodiment of our invention;

Fig. 2 is a sectional plan view, taken on the line II—II of Fig. 1, showing the method of arranging the groups of iron sheets around the reactor;

Figure 3:
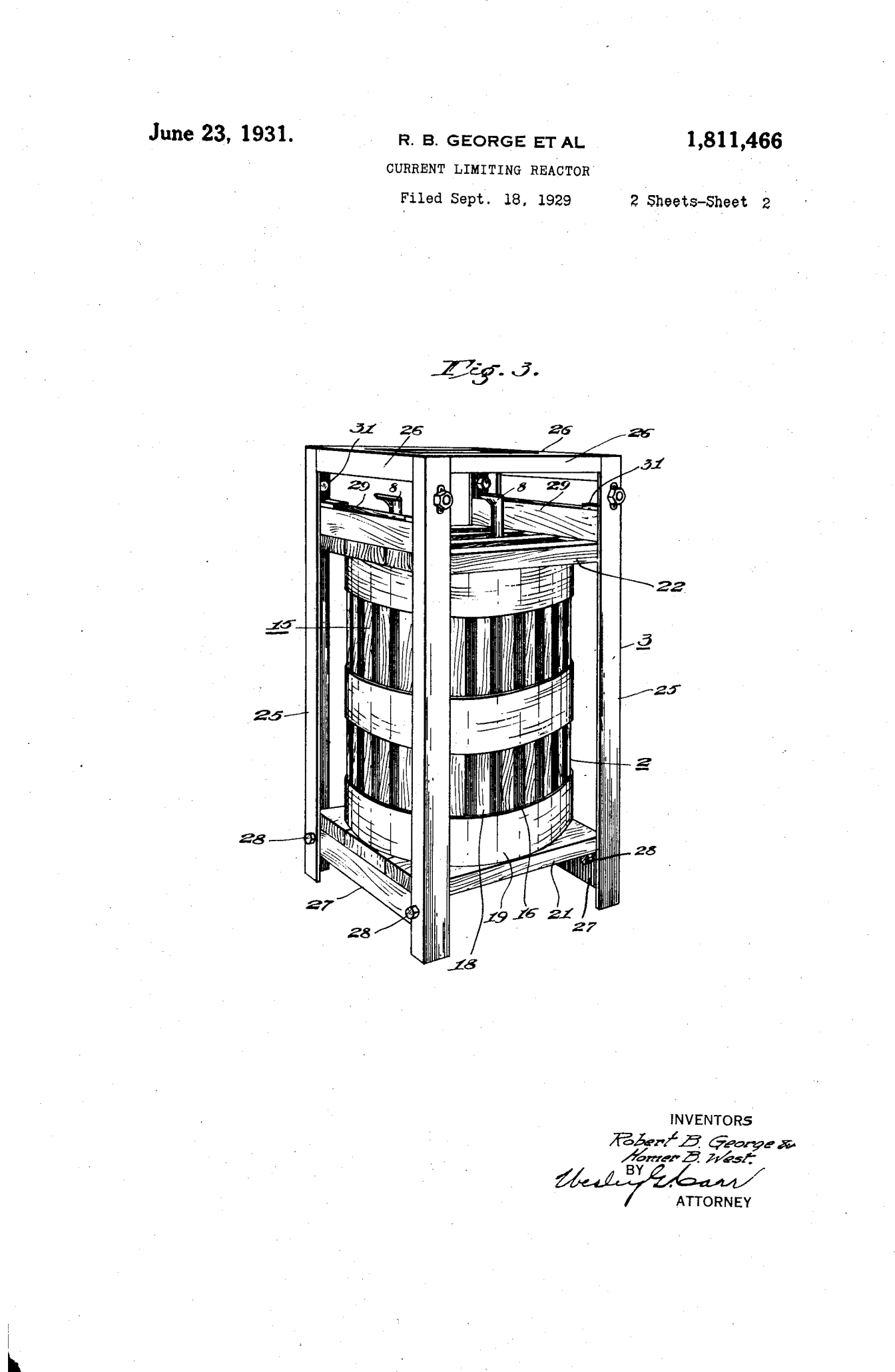

Fig. 3 is a perspective view of the reactor and its magnetic shield resting on a supporting structure.

Referring to the drawings, a current-limiting reactor 2 rests on a supporting structure 3 and is immersed in an insulating fluid 4 contained in a casing 5. The casing 5 has a cover 6 through which extend insulating bushings 7 for conducting leads 8.

The current-limiting reactor 2 comprises a cylindrical shaped member 9 having an air core and a winding 11 comprises a plurality of convolutions of insulated electrical conductor 12 surrounding the member 9. Vertically extending spacing members 13 are disposed between adjacent convolutions of the winding to ensure sufficient space for the circulation of oil through the winding. The vertical members 13 are arranged in groups and each group is disposed radially of the center of the reactor. Layers of paper or other insulating material 14 are wrapped around the outside of the winding and are separated therefrom by the vertical spacing members 13 to allow the circulation of oil therebetween.

A magnetic shield 15 is placed around the winding 11 next to the insulating material 14. The magnetic shield 15 comprises a plurality of groups of iron sheets 16 parallel to the axis of the reactor and supported, at their ends, by annular members 17 that extend around the top and the bottom of the reactor 2. Vertical spacing members 18, of wood or similar material, are located between the groups 16 of iron sheets and are also supported by the annular members 17. The groups 16 of iron sheets, the spacers 18 and the annular members 17 are banded together with tape or other suitable binding material 19. If desired, the members 18 may be omitted.

The winding 11 of the reactor 2 has associated therewith a lower end member 21 and an upper end member 22 that support the annular members 17 and hold them in proper spaced relation. The end members are separated from the turns of the winding by spacing members 23 and have openings therein through which the cylindrical member 9 extends. The reactor and its shield and end members may be varnished or impregnated as a unit and placed in a tank of suitable size.

The current-limiting reactor 2 is supported by a framework 3 which comprises vertically extending frame members 25 having members 26 welded thereto to connect them together at the top. The bottom end member 21 of the reactor rests on members 27 disposed near the bottom of the framework 3 and secured thereto by the bolts 28. The upper end member 22 is tightly held in place by members 29 and angles 31 that are secured to the frame members 25.

The groups 16 of iron sheets provide paths of high permeability for the return of the reactor flux. Preferably a high-grade iron, such as is employed for transformer cores, is utilized to keep the flux density low, so that the loss is relatively small.

It will be apparent that the shield may take different forms and be attached to the reactor winding in a different manner without departing from the spirit of our invention. It will be evident that, in applying our invention, standard transformer tanks may be employed without alteration, and no extra framework or supporting structure is required. The shield is placed in a much more effective location, thereby using less iron and effecting economies heretofore unobtainable.

It will be apparent that we have provided a magnetic shield for oil-immersed reactors that is simple in construction and efficient and economical of materials.

Since many modifications within the spirit and scope of our invention will occur to those skilled in the art, we do not wish to be limited otherwise than as set forth in the appended claims.

We claim as our invention:

1. In a current-limiting reactor, means for conducting the stray magnetic flux along the periphery of said reactor coil when energized, said means comprising parallel groups of continuous iron laminations attached to the periphery of said reactor and formed integral therewith.

2. In a current-limiting reactor, a winding comprising a plurality of layers of insulated electric conductor, a plurality of groups of continuous laminations surrounding the winding and attached thereto and adapted to conduct magnetic flux in a plurality of paths close to the winding when said winding is energized.

3. In a current-limiting reactor, a winding comprising a plurality of convolutions of an insulated electric conductor, a plurality of continuous laminated means disposed around the outer convolutions of the winding and made integral therewith for confining the magnetic flux to a predetermined path when the winding is energized.

4. In a reactor structure, a casing containing insulating fluid, a reactor coil comprising a winding formed of an insulated electric conductor and immersed in said fluid, means for preventing the stray magnetic flux from entering said casing when said reactor is energized, comprising a magnetic shield disposed around the reactor coil and attached thereto and adapted to intercept said stray flux and to confine it to an area bounded by said shield.

5. In an oil-immersed current-limiting reactor, a casing containing insulating fluid, a reactor coil comprising a plurality of layers of insulated electric conductor immersed in said fluid, a magnetic shield for preventing the production of eddy currents in said casing when the reactor is energized, said shield comprising a plurality of spaced groups of continuous iron laminations constituting a plurality of magnetic paths circumferentially disposed about the winding parallel to the axis thereof.

6. In an oil-immersed current-limiting reactor, a casing containing insulating oil, a reactor coil comprising a plurality of layers of insulated electric conductor submerged in said oil, a magnetic shield affixed to the reactor coil at the periphery thereof for preventing the stray flux from entering the casing, said shield comprising a plurality of groups of continuous iron laminations located about said periphery to form a plurality of low reluctance paths parallel to the axis of the coil.

In testimony whereof, we have hereunto subscribed our names this 12th day of September, 1929.

ROBERT B. GEORGE.
HOMER B. WEST.